United States Patent [19]

Miyake et al.

[11] Patent Number: 4,805,874
[45] Date of Patent: Feb. 21, 1989

[54] VALVE CASING FOR USE IN A BUTTERFLY VALVE

[75] Inventors: Katsunobu Miyake; Hiroshi Horii; Kenji Ikoma, all of Osaka, Japan

[73] Assignee: Kurimoto, Ltd., Osaka, Japan

[21] Appl. No.: 948,277

[22] Filed: Dec. 31, 1986

Related U.S. Application Data

[63] Continuation-in-part of Ser. No. 784,122, Oct. 4, 1985, Pat. No. 4,669,499.

[30] Foreign Application Priority Data

Sep. 12, 1986 [JP] Japan .................. 61-294386

[51] Int. Cl.⁴ .............................................. F16L 7/00
[52] U.S. Cl. ...................................... 251/306; 137/375
[58] Field of Search ...................... 137/375; 251/306

[56] References Cited

U.S. PATENT DOCUMENTS

| | | | |
|---|---|---|---|
| 3,073,336 | 1/1963 | Johnson | 137/375 |
| 3,721,245 | 3/1973 | Jones et al. | 251/315 |
| 3,902,697 | 9/1975 | Robinson | 251/306 |
| 3,961,405 | 6/1976 | Robinson | 29/157.1 R |
| 4,272,054 | 6/1981 | Zinnai | 251/306 |
| 4,669,499 | 6/1987 | Miyake et al. | 137/375 |

FOREIGN PATENT DOCUMENTS

| | | |
|---|---|---|
| 3302159 | 7/1984 | Fed. Rep. of Germany ...... 251/306 |
| 46-2633 | 1/1971 | Japan . |
| 46-15032 | 5/1971 | Japan . |
| 50-59820 | 9/1974 | Japan . |

*Primary Examiner*—A. Michael Chambers
*Attorney, Agent, or Firm*—Jones, Tullar & Cooper

[57] ABSTRACT

In the valve casing according to the invention, a cylindrical elastic member is fitted to solidly coat a whole inner surface of the valve casing to form a passage, while performing a function as a seal ring for pipe lines and a function as a seat ring for a valve disc.

2 Claims, 5 Drawing Sheets

VALVE CASING FOR USE IN A BUTTERFLY VALVE

CROSS REFERENCE TO RELATED APPLICATION

This application is a continuation-in-part application of application, Ser. No. 784,122 filed 10/04/85 now U.S. Pat. No. 4,669,499 issued 06/02/87.

BACKGROUND OF THE INVENTION

1. Field of the Invention

The present invention relates to a valve casing for use in a butterfly valve and, more particularly, to a novel structure of a valve casing formed by press working of metal plates.

2. Description of the Prior Art

A valve casing having been conventionally manufactured by casting a metal material such as cast iron or non-ferrous metal and machining a cast product, but recently as a result of advances in sheet pressing, the valve casing is also manufactured by a method wherein a iron or non-ferrous metal plate is formed into a valve casing by press working and a machining process thereof is either omitted or less applied. By such a method, a large amount of valve casings are now efficiently mass-produced with their dimensional accuracy assured, thereby resulting in considerably savings in the manufacturing costs thereof in comparison with the conventional method by casting and machining.

Furthermore, since the weight of a valve manufactured by the aforesaid recent method is much lighter, an advantage can be enjoyed when installing it on a pipe line, and since loads applied to the pipe line during the operation of the valve are decreased, a further advantage is enjoyed from the standpoint of maintenance.

Notwithstanding such advantages, a valve casing used in butterfly valves produced by press working has several disadvantages mainly due to poor thickness which are not the case for a valve produced by conventional casting.

For example, since the thickness of a molded valve casing is relatively poor, a stress concentration is applied to seal ring receiving portions when joining the molded valve casing to an adjacent pipe, resulting in deformation or breakage.

There is another problem that a seal ring gets out of place or broken, bringing about imperfect sealing during operation.

A further problem exists in that heat energy is lost when the temperature of a fluid passing through the passage is held while outside air temperature is low. To the contrary, when the temperature of a fluid is low while that of the outside air is high, there is the possibility that such problems as freezing, pipe breakage, etc. arise in the process of heat transference, although these problems are not peculiar to the valve casings produced by press working but are common in every valve casting.

BRIEF DESCRIPTION OF PRIOR EMBODIMENT

In order to solve these problems, an invention entitled "Valve Casing for Use in a Butterfly Valve" which is the subject of copending application thereof to Ser. No. 784,122 now U.S. Pat. No. 4,669,499 issued 06/02/87, was developed. As shown in FIG. 5, which corresponds to FIG. 1 of the noted patent a valve casing is shown which comprises an outer shell 5a and an inner shell 4a in the form of a double structure, and in which the inner shell comprises a cylindrical part 6a defining an inner bore (or passage) and a seal ring receiving portion 7a formed on both ends so as to have larger diameters than that of the cylindrical part. The outer shell 5a defines a space 8a by surrounding an outer periphery of the inner shell 4a, and the inner shell and the outer shell are solidly fixed to each other at both ends 17 of the valve casing.

It is recommended, as a preferred embodiment of the invention disclosed in the noted patent, that the seal ring receiving portion 7a is substantially S-shaped in section with a width W1 on the outer diameter side larger than a width W2 on the inner diameter side, and that a metal material for the inner shell 4a and for the outer shell 5a are to be different from each other (for, example, the outer shell is made of stainless steel, while the inner shell is of mild steel). According to this preferred embodiment of a circular valve disc 3a is turnably supported on a valve stem 2a, and the sealing function of the valve casing and the valve disc is performed by applying a seat ring 19 made of an elastic material such as rubber to the whole periphery of the valve disc.

The valve casing for use in butterfly valves according to this preferred embodiment solves the problems of strength when arise when clamped from both sides in the state of being put between left and right pipe lines and are difficult to overcome due to poor thickness. Furthermore, since the seal ring receiving portion 7a is formed into an S-shape, a peculiar effect is exhibited such that an annular seal ring 18 hardly gets out of place or broken.

Furthermore, since a space 8a is defined, serving as a heat insulating layer by surrounding the whole outer periphery of the inner shell, it is not necessary to take any preventive measures for prevention of energy loss, accidents resulting in injury or death due to high temperature and dewing due to decrease in the outside air temperature, nor is any particular heat insulating material for prevention of freezing required.

Moreover, since the inner shell is not influenced by the outside air temperature and kept at the same temperature level as a fluid passing through the bore and the valve disk, the problem of imperfect sealing caused by expansion of the valve casing due to a rise in the outside air temperature and imperfect operation of the valve caused by contraction of the valve casing due to decrease in the outside air temperature, both frequently occurring in the prior arts, are successfully eliminated.

Described above are objects, features and advantages of the valve casing of a preferred embodiment disclosed in the noted patent, and although it may be said that there remains no particular serious problem in the prior art due this preferred embodiment, the present invention intends to further improve the advantages of this preferred embodiment.

To be more specific, it seems that there is no better way other than this preferred embodiment in view of the improvement strength, but there is a demand for further improvement of the function of the valve casing for the purpose preventing the seal ring from getting out of place and elimination of the above-discussed problems arising at the time of heat transference.

SUMMARY OF THE INVENTION

An object of the present invention is therefore to satisfy the foregoing demand and to provide a valve casing for use in butterfly valves by which the valve casing proposed as a preferred embodiment in the noted patent is further improved with respect to preventing the seal ring from getting out of place and elimination of the problems at the time of heat transference.

The foregoing object is accomplished by providing a valve casing for use in butterfly valves comprising an outer shell and an inner shell in the form of the above-described double structure, and in which a cylindrical member composed of an elastic material is fitted so that a whole inner surface of the valve casing from inside the cylindrical part of the inner shell to the seal ring receiving portions is coated with the cylindrical member of an elastic material, thereby forming a passage and performing a function as a seal ring.

In order to more effectively achieve the foregoing object, it is preferable that a section of each seal ring receiving portion is S-shaped with its width on the outer diameter side larger than its width on the inner diameter side, and that an annular projection is formed near the portion where a concave is inflected to a convex forming the S-shaped seal ring receiving portion, so that an outer end of the cylindrical member is held in the concave of the S-shape portion and retained by the annular projection.

According to the foregoing structure, as is explicit from FIGS. 1 to 3 illustrating an embodiment of the present invention, the whole inside of the valve casing is coated with the elastic cylindrical member 9, the inner shell does not come in direct contact with a fluid, and the rate of flow depends on the inner diameter of the elastic cylindrical member. That is to say, a portion coming in contact with the fluid and forming the passage is made of the elastic material. Opening and closing operation of the valve is performed by turning a valve disc fixed to a valve stem in the center of the cylindrical part. Since the cylindrical elastic member is deformed in accordance with the turning of the valve disc, a sealing function is performed between the inner periphery of the valve casing and the circumference of the valve disc.

Furthermore, since both ends of the elastic cylindrical member are engagedly inserted in the seal ring receiving portions near both ends of the valve casing as they are, a sealing function is also performed between each seal ring receiving portion and the joining pipe. In other words, this elastic cylindrical member performs every function carried out by the cylindrical part 6a, the seal ring 18 and the seat ring 19 in the preferred embodiment of the noted patent.

The present invention is so constructed as noted above and performs the foregoing function that the advantages described hereinafter are insured in addition to the solution of the problem of poor thickness and prevention of the valve casing from being deformed or breaking.

The elastic cylindrical member provided in the inner shell of the valve casing forms a passage by the inner diameter thereof and controls the rate of flow, and besides performs a function as a seat ring between it and the valve disk on the center portion while performing a further function as a seal ring between it and the joining pipes at the end portions. Since the elastic cylindrical member is solidly arranged being inserted through the valve casing in the axial direction thereof, the structure as a whole is strong and tough by far as compared with the prior noted preferred embodiment in which the cylindrical part 6a, seal ring 18 and seat ring 19 of the prior noted preferred embodiment are separately arranged to perform those functions. Accordingly, when a large stress is applied to the elastic cylindrical member, the member having a larger volume elastically deforms itself and successfully absorves the stress. As a result, breakage of the cylindrical elastic member hardly occurs. Further, so long as the cylindrical elastic member is not broken, the member does not get out of place so that its sealing function is not lost, the life span of the valve being lengthened thereby.

In this connection, according to the prior noted preferred embodiment, an arrangement other than that illustrated in FIG. 5 is also preferably adopted, and in which two discs are superposed, and a peripheral edge portion thereof is open to form a recess groove into which an annular seat ring is engagedly fitted. According to such an arrangement, however, a large torsional stress (or torque) applied when performing an open and close operation is obliged to be met or absorved by a concentrated elastic deformation of the seat ring having a smaller volume. As a result, the seat ring is sometimes broken by the load and gets out of place in the same way as the prior noted preferred embodiment illustrated in FIG. 5. Such a problem is also solved by the present invention.

Concerning the sealing of both ends joined to the pipes, since the clamping force applied when joining to the pipes and the pressure due to a fluid passing through the valve casing are received and sufficiently absorbed by the large volume of the cylindrical elastic member, there is no possibility that the seal ring will get out of the seal ring receiving portion.

Furthermore, according to the invention, a heat insulating effect is sufficiently attained, since the inside of the inner shell is completely coated with the elastic member of heat insulating material in addition to the double structure of the outer shell and the inner shell forming a space which inhibits heat transfer. It can be said that even when the inner shell is made of some economical steel in place of stainless steel, substantially the same effect is attained by disposing the elastic material which inhibits the heat transfer between the outside air and the fluid inside. When the inner shell of a special steel to meet exposure to a special atmosphere such as a corrosive atmosphere is replaced with some ordinary steel, the same effect is insured since the whole portion coming in contact with the fluid is composed of the elastic member of high corrosion resistance.

Other features and advantages of the present invention will become apparent in the course of the following description together with the accompanying drawings.

BRIEF DESCRIPTION OF THE DRAWINGS

In the drawings forming a part of the present application.

DESCRIPTION OF THE PREFERRED EMBODIMENT

Figure 1:
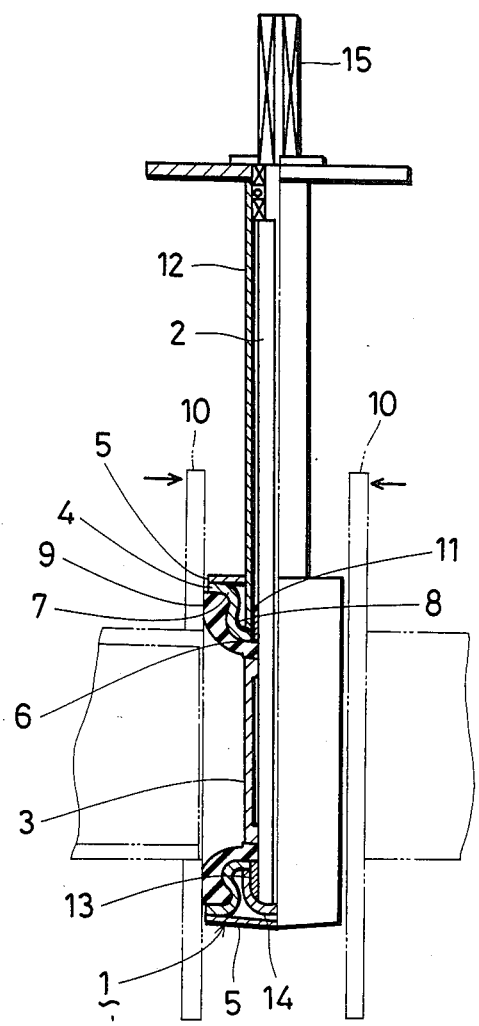
FIG. 1 is a partially sectional front view of an embodiment of the present invention.
Figure 2:
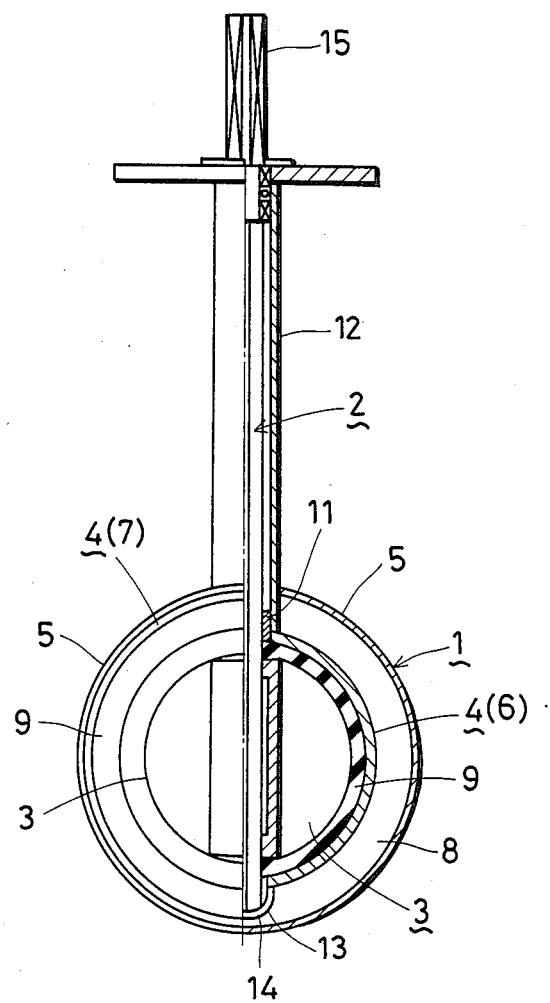
FIG. 2 is a partially sectional side view of the embodiment of the present invention.
Figure 3:
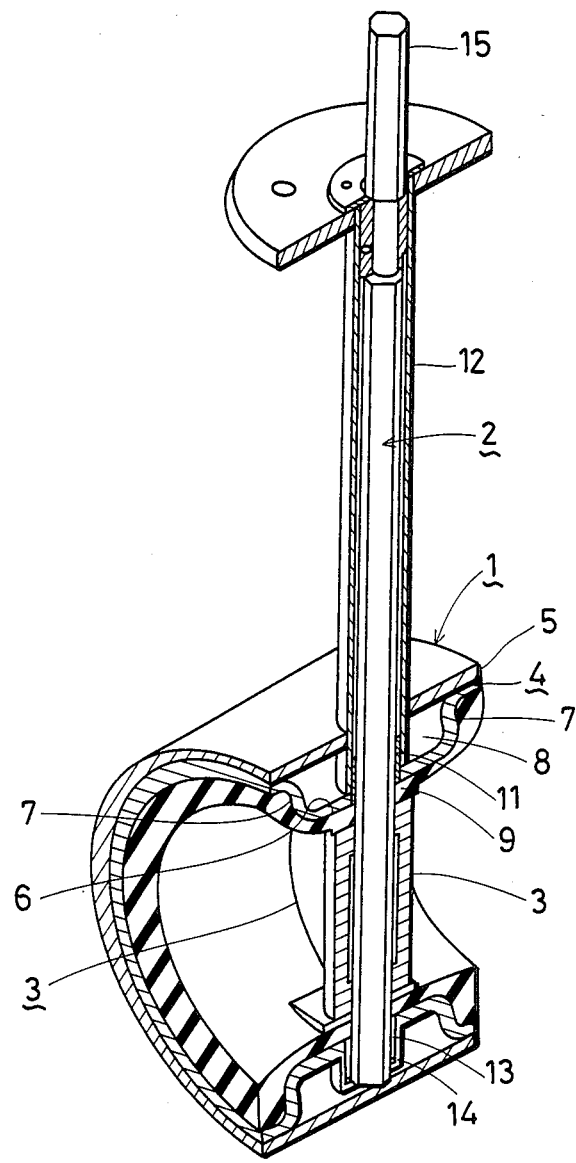
FIG. 3 is a partially cutaway perspective view of the embodiment of the present invention.

Referring now to FIGS. 1 to 4, two preferred embodiments of the invention are described in detail hereinafter.

In these drawings, a valve casing 1 comprising an inner shell 4 and an outer shell 5 is fitted to a pipe line 10 held between flanges 10, 10 of the pipe line.

The inner shell 4 formed into a cylindrical body of thin steel plate defines an inside bore (i.e., a passage). A middle part of the inner shell 4 is used as a cylindrical part 6 as it is, and both ends thereof are enlarged to form S-shaped seal ring receiving portions 7, 7 by press working.

The outer shell 5 formed into a thin cylindrical body of a steel plate is engagedly fitted to the outer periphery of the inner shell, being superposingly fixed to each other by butt welding.

A valve stem (or valve rod) 2 is a shaft member of square shape in section and is turnably supported by an upper bearing 12 through an upper bush 11 and by a lower bearing 14 through a lower bush 13, respectively.

Drive means (not illustrated) such as a spanner, dedicated lever, wheel and others, are mounted on a driven part 15 protruding from the upper bearing 12 when turning the valve stem 2 in the valve casing 1.

Inner peripheries of both upper and lower brushes 11 and 13 are also square-shaped corresponding to the outer periphery of the valve stem 2 and are fixed to the valve stem by press-fitting. Outer peripheries of the brushes 11, 13 are cylindrically formed and are turnable in the upper and lower bearings 12, 14.

A valve disc 3 is fixedly mounted on the valve stem 2 in the valve casing 1.

A cylindrical member 9 composed of an elastic material such as rubber is inserted in the circumferential portion of the inner shell to form a passage while being fitted to the outer peripheral edge of the valve disc 3. The elastic cylindrical member 9 comes in close contact with the outer peripheral edge of the valve disc all over the inner periphery of the inner shell to seal the passage when closing the valve. Both outsides of this elastic cylindrical member are thickened and inserted in the seal ring receiving portions 7. That is to say, the cylindrical member performs a sealing function in connection with the pipe line and prevents a fluid inside from leakage as described above.

As a matter of course, several members can be replaced with some known device. For example, the valve stem 2 can be formed of a hexagonal material in place of the above square-shaped material.

The cylindrical member 9 described above is a component separately formed of elastic material such as rubber, and is fitted inside the inner shell. But, since the present invention is characterized by the elastic cylindrical member which is exposed to be in direct contact with a fluid over the full surface thereof, it is also preferable that some fluid elastic material is injected into the inner shell and baked there so that a cylindrical member is fixedly interposed inside the inner shell as a result.

According to such an embodiment, a considerable improvement is attained in the aspects of work efficiency, productivity, performance of the valve, durability and maintenance as compared with the conventional butterfly valve in which individual members (seal ring, seat ring) are separately made and assembled.

Figure 4:
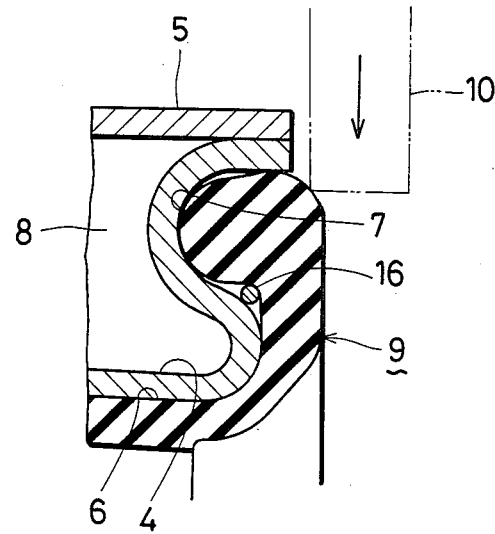
FIG. 4 is a sectional front view to an enlarged scale of another embodiment of the present invention.
Figure 5:
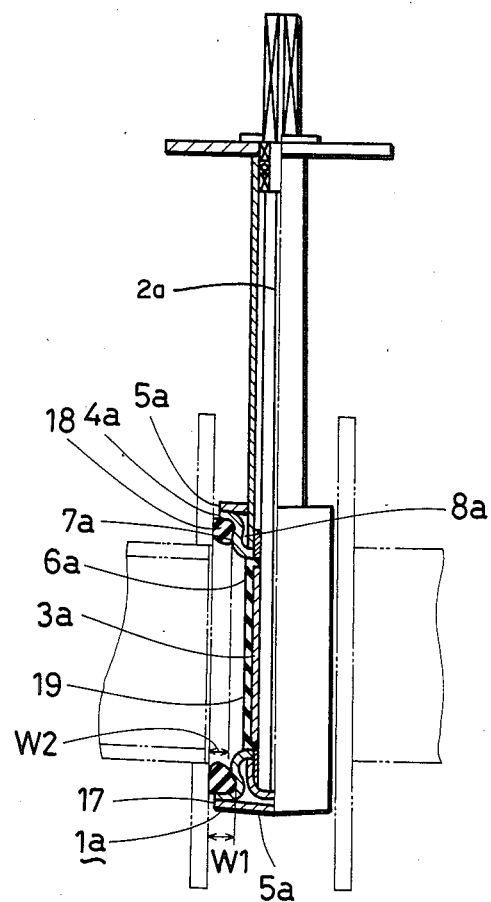
FIG. 5 is a partially sectional front view of the prior noted preferred embodiment of U.S. Pat. No. 4,669,499.

FIG. 4 illustrates a further embodiment in which means for effectively achieving the object is added.

In the drawing, the seal ring receiving portion 7 is substantially S-shaped in section, and the cylindrical elastic member 9 is held in the concave portion thereof. It is to be noted that an annular projection 16 is provided near the portion where the concave is inflected to the convex. An annular member made of a metal bar is preferably used as this annular projection. There is no inconvenience if a circle forming the annular projection is not complete having cutaway portions.

According to this second embodiment, a peculiar effect is exhibited such that outer ends of the elastic cylindrical member is securely held in the seal ring receiving portion which is substantially S-shaped in section without getting out of place, performing thereby a perfect sealing function. Furthermore, when interposing a butterfly valve between the pipe lines, although the elastic cylindrical member 9 is initially pressed toward the center of the valve casing by the flange 10, it is retained at the portion, where the cylindrical elastic member is held as described above, by the annular projection 16, resulting in the prevention of the cylindrical member from being moved.

Having described the present invention as related to the embodiment illustrated in the accompanying drawing, it is intended that the present invention is not restricted by any of the details of the foregoing description, but rather be constructed broadly within the spirit and scope set forth in the accompanying claims.

What is claimed is:

1. A valve casing for use in a butterfly valve, comprising:
    an inner shell and an outer shell formed as a double structure, said inner shell comprising a cylindrical part defining an inner bore and seal ring receiving portions formed on the ends of said cylindrical part, said outer shell surrounding said inner shell and defining therewith a space, said inner and outer shell being solidly fixed to each other at the ends of the valve casing; and
    a cylindrical member comprising an elastic material, said cylindrical member having an extent so that the inner bore and seal ring receiving portions of said cylindrical part are covered by said cylindrical member, said cylindrical member forming a passage and serving as a seal ring.

2. A valve casing as claimed in claim 1, wherein each seal ring receiving portion is S-shaped in section with its width on the outer diameter side larger than its width on the inner diameter side, and that an annular projection is formed near a portion where a concave is inflected to a convex forming said S-shaped seal ring receiving portion, so that an outer end of the cylindrical member is held in the concave of the S-shape portion and retained by said annular projection.

* * * * *

UNITED STATES PATENT AND TRADEMARK OFFICE
CERTIFICATE OF CORRECTION

PATENT NO. : 4,805,874

DATED : February 21, 1989

INVENTOR(S) : Katsunobu Miyake

It is certified that error appears in the above-identified patent and that said Letters Patent is hereby corrected as shown below:

Title page:

Foreign Application Priority Data should read:

-- Dec. 9, 1986 [JP]  Japan -------- 61-294386 --

Signed and Sealed this

Third Day of October, 1989

Attest:

DONALD J. QUIGG

*Attesting Officer*

*Commissioner of Patents and Trademarks*